US006012021A

United States Patent [19]

Rombach et al.

[11] Patent Number: 6,012,021

[45] Date of Patent: Jan. 4, 2000

[54] MICROELECTRIC POSITION SENSOR

[75] Inventors: Pirmin Rombach, Lyngby; Lars J. Stenberg, Roskilde, both of Denmark

[73] Assignee: Microtronic A/S, Roskilde, Denmark

[21] Appl. No.: 09/034,615

[22] Filed: Feb. 27, 1998

[30] Foreign Application Priority Data

Feb. 28, 1997 [DK] Denmark ........................ 0227/97

[51] Int. Cl.[7] ........................ G01B 7/30

[52] U.S. Cl. ........................ 702/150; 702/38; 702/94; 324/235; 324/207.2; 324/207.6; 338/32 R; 338/32 H

[58] Field of Search ........................ 702/150, 33, 38, 702/94, 151; 324/207.25, 207.13, 235, 207.2, 207.6; 381/312; 335/205, 206, 207; 338/32 R, 32 H

[56] References Cited

U.S. PATENT DOCUMENTS 3,139,600 6/1964 Rasmanis et al. ........................ 338/32

*Primary Examiner*—Marc S. Hoff
*Assistant Examiner*—Hien Vo
*Attorney, Agent, or Firm*—Watson Cole Grindle Watson P.L.L.C.

[57] ABSTRACT

A microelectric position sensor wherein an assembly of magnetic field sensitive elements assume first and second states when subjected to a magnetic field having an intensity below or above first or second predetermined values respectively. A magnet is selectively movable relative to the assembly, so that the elements are selectively subjected to the magnetic field. The magnet has focusing tongues for focusing the magnetic field at a region including substantially only one of the elements, so that the magnetic field within the region has an intensity above the second value, and the magnetic field outside the region has an intensity below the first value.

12 Claims, 2 Drawing Sheets

MICROELECTRIC POSITION SENSOR

TECHNICAL FIELD

The invention relates to a microelectric position sensor for use in microelectronic equipment. The microelectric position sensor according to the invention is of the type including an assembly of magnetic field sensitive elements such as micro miniature reed switches or Hall effect elements, and means creating a magnetic field such as a permanent magnet for selectively influencing and activating the magnetic field sensitive elements. The magnetic field sensitive elements each have a switching function, and they thus form an assembly of switches which are operated by the magnet. In analogue circuits the assembly of switches can be connected to an assembly of e.g. thin film resistors, whereby e.g. a potentiometer with discrete positions can be made. In digital circuits the assembly of switches can control the performance and functions of the digital circuit.

A microelectric position sensor of the invention will find its main applications in microelectronic equipment such as hearing instruments where it can be used for controlling the gain or the output volume and other settings of the hearing instrument. Hearing instruments have been subject to a continuing miniaturisation, and in particular the electronic circuits have been miniaturised. Modern analogue hearing instruments typically include up to a hundred electronic components or elements, whereas modern digital hearing instruments of the all-in-the-ear type may include integrated circuits with hundreds of thousands of electronic elements. A microelectric position sensor according to the invention is suitable for such use in analogue as well as in digital hearing instruments. The ever increasing level of integration in digital circuits including digital hearing instruments demands a high resolution in the gain control in order to fulfil the needs of the users.

BACKGROUND ART

Traditional electromechanical resistive track potentiometers or trimmers convert a manually set angular or linear position to a corresponding resistive divider ratio according to a mapping function, which, in principle, is continuous. The operating principle is based on an electrically conductive wiper, which is moved manually along or around a distributed track of resistive material, e.g. a carbon based material. Low resistance electrical contacts are provided at both ends of the track and also at the wiper, and such potentiometers provide a resistive division of a voltage applied at the ends of the track by translation of a linear or angular position of the movable part of the potentiometer.

Traditional electromechanical slide or rotational switches rely on a mechanical wiper with an electrically conductive tip or edge which opens or closes the electrical contact between two or more terminals of the switch. The opening and closing function of switches may then be used for selecting, enabling or disabling different parts of electric circuitry connected to the switch.

Traditional potentiometers, trimmers and switches are mechanical devices having moving parts in contact with each other, and wear is therefore unavoidable. The electrical performance of such elements is severely affected by the wear, and reliability problems often become pronounced in miniaturised elements.

U.S. Pat.No. 5,592,079 discloses such a known microelectric position sensor, however without any focusing of the magnetic field.

U.S. Pat.No. 4,258,346 discloses an arrangement including an assembly of magnetically actuated relays mounted adjacent a magnetic shield having an assembly of holes therein corresponding to the location of the relays. The shield prevents magnetic flux which is applied to one of the relays from being spilled over and inadvertently actuating a nearby relay.

SUMMARY OF THE INVENTION

It is the object of the invention to provide a microelectronic position sensor which can be used for sensing the linear or rotary position of e.g. the gain control in a microelectronic apparatus such as a hearing instrument, which remedies the disadvantages of the known devices.

This object is achieved by means of the microelectric position sensor of the invention in which the magnet creating the magnetic field activating and deactivating the magnetic field sensitive elements includes focusing means focusing the magnetic field to a region including substantially only one of the magnetic field sensitive elements. A microelectronic position sensor having such a focusing arrangement can be made substantially smaller and more compact than any of the known devices, and, as a very important advantage, it can include a much higher number of individual magnetic field sensitive elements, thereby achieving the desired higher resolution.

In the preferred embodiment, the magnetic field sensitive elements are micro reed switches, but Hall effect elements may also be used with minor modifications, which are obvious to the skilled person.

The gain control in hearing instruments usually has a rotary knob, and for this use the assembly of magnetic field sensitive elements are provided in a circular assembly. However, for other purposes the magnetic field sensitive elements can be arranged in a linear assembly. An arrangement of the magnetic field sensitive elements in a two-dimensional assembly or matrix is also possible. This embodiment can be applied in high resolution proximity or touch sensitive surfaces and can be used in joy sticks and other pointing devices.

BRIEF DESCRIPTION OF THE DRAWINGS

In the drawings two preferred embodiments of the invention are shown schematically.

DETAILED DESCRIPTION

Figure 1:
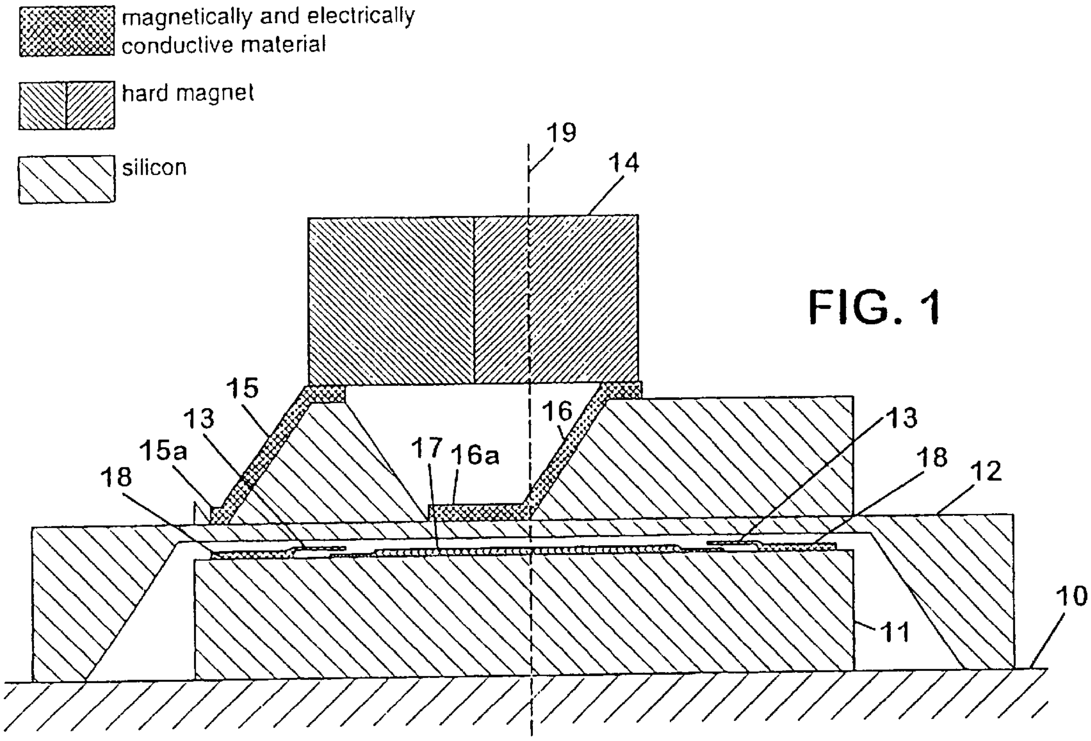
FIG. 1 is a sectional view of a microelectric position sensor with a circular assembly of magnetic field sensitive elements.
Figure 2A:
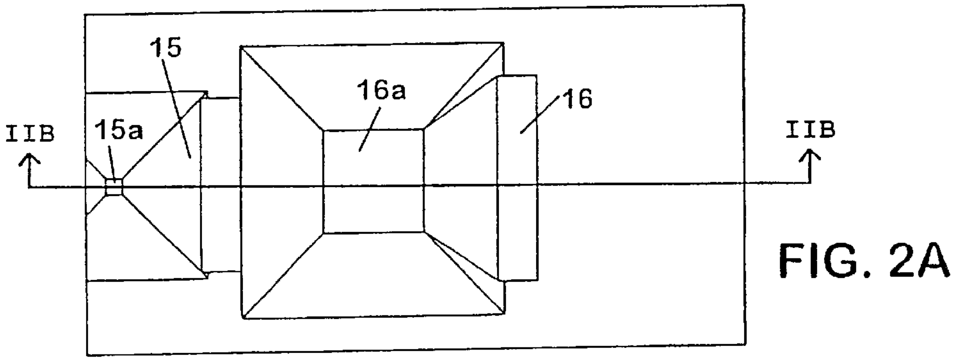
FIG. 2A is a plan view of the arrangement for focusing the magnetic field.
Figure 2B:
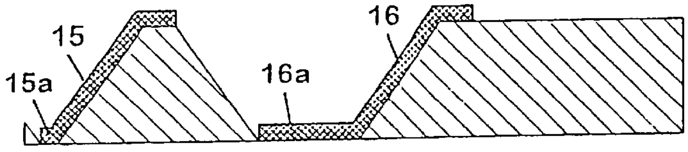
FIG. 2B is a sectional view taken along the line IIB—IIB in FIG. 2A.

FIGS. 1, 2A and 2B illustrate a microelectric position sensor of the rotary type. The sensor has a base 10 of silicon or other suitable material carrying a circular disc-shaped static part 11 also of silicon in solid connection with the base 10. The static part 11 carries an assembly of micro reed contactors or switches 13. A cover 12 of an inverted cup shape is fixed over the static part 11 and rests with its edge on the base 10 and thus covers and protects the reed contactors 13 e.g. against dust. The base 10, the static part 11 and the cover 12 together form, together with the reed contactors, a static construction. The reed contactors 13 can be manufactured in a number of ways, but for this application a preferred contactor is described in the article *A New Reed Micro-contactor Fabricated by Multilevel UV-lithography and Electrodeposition, Intermediate report* $M^2S^2$ 1994, pp. 4–5, ASULAB SA., CSEM. The microcontactors are thus fabricated using photo lithography techniques adapted from microelectronics combined with advanced plating technology. Important features of these micro reed contactors are that they are very small, typically smaller than 100 $\mu$m * 100 $\mu$m, the excellent device properties and the potential possibility of batch production of monolithic assemblies of micro reed contactors.

The cover 12 carries a bar magnet 14 of permanently magnetised material. The bar magnet 14 rests near its two ends on magnetic focusing devices which, in the shown embodiment are shaped like tongues 15 and 16 consisting of magnetically conductive material. The tongues 15 and 16 have end portions 15*a* and 16*a* distant from the bar magnet 14. The focusing tongues 15 and 16 concentrate the magnetic field created by the bar magnet 14 in a region about a selected one of the micro reed contactors 13. Centrally each micro reed contactor 13 is connected to a central part 17 of magnetically and electrically conductive material common to all the micro reed contactors, and peripherally each micro reed contactor has its own individual peripheral part 18 also of magnetically and electrically conductive material. The end portion 16*a* of the focusing tongue 16 is situated above the central part 17 common to all the reed contactors, whereas the end portion 15*a* of the focusing tongue 15 is situated above the peripheral part 18 of one of the reed contactors 13 and is sized to concentrate the magnetic field at the peripheral part of a selected one of the reed contactors.

A magnetic circuit is thus formed by the bar magnet 14, the focusing tongues 15 and 16, a selected one of the reed contactors 13 including the peripheral part 18 thereof and the central part 17, thereby causing the selected micro reed contactor to be activated and to close the electrical path between the common central part 17 and the individual peripheral part 18 corresponding to the selected micro reed contactor. Electrical terminals (not shown) are connected in known manner to the common central part 17 and to each of the individual peripheral parts 18.

The bar magnet 14 and the focusing tongues 15 and 16 are connected to a (not shown) finger wheel and can be rotated about the central axis 19 relatively to the static construction formed by the base 10, the static part 11 and the cover 12, thereby displacing the end portion 15*a* of the focusing tongue 15 across the circular assembly of micro reed contactors 13, whereby the micro reed contactors will be activated individually, and electric contact will be created between the common central part 17 and the peripheral part 18 of the selected one of the micro reed contactors 13.

Figure 3B:
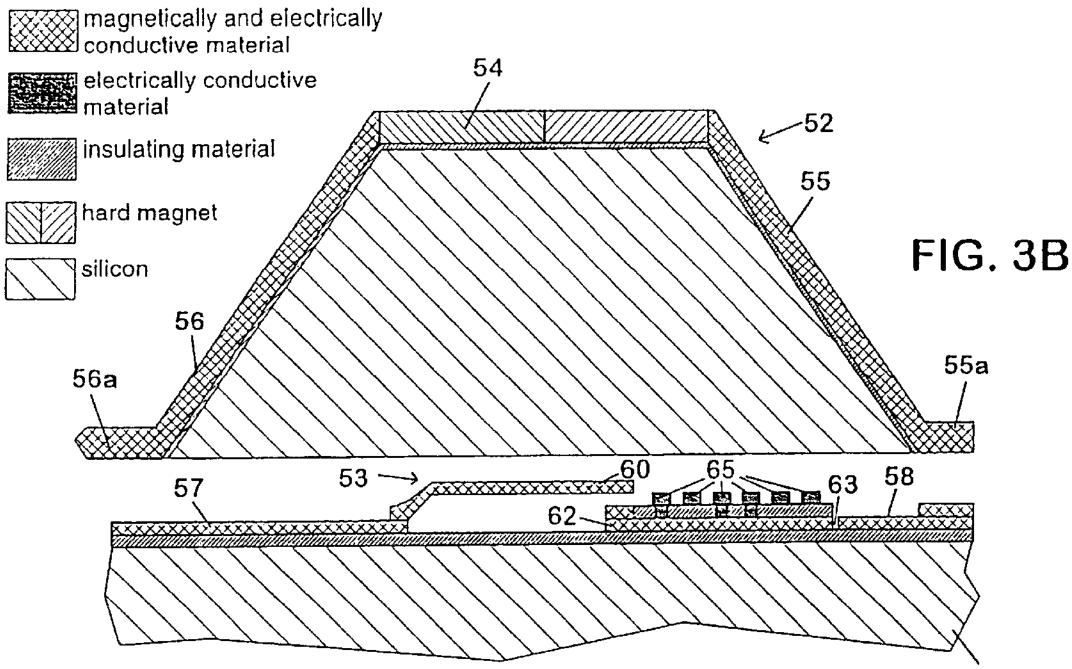
FIG. 3B is a sectional view through the microelectric position sensor in FIG. 3A corresponding to the line IIIB—IIIB.
Figure 3A:
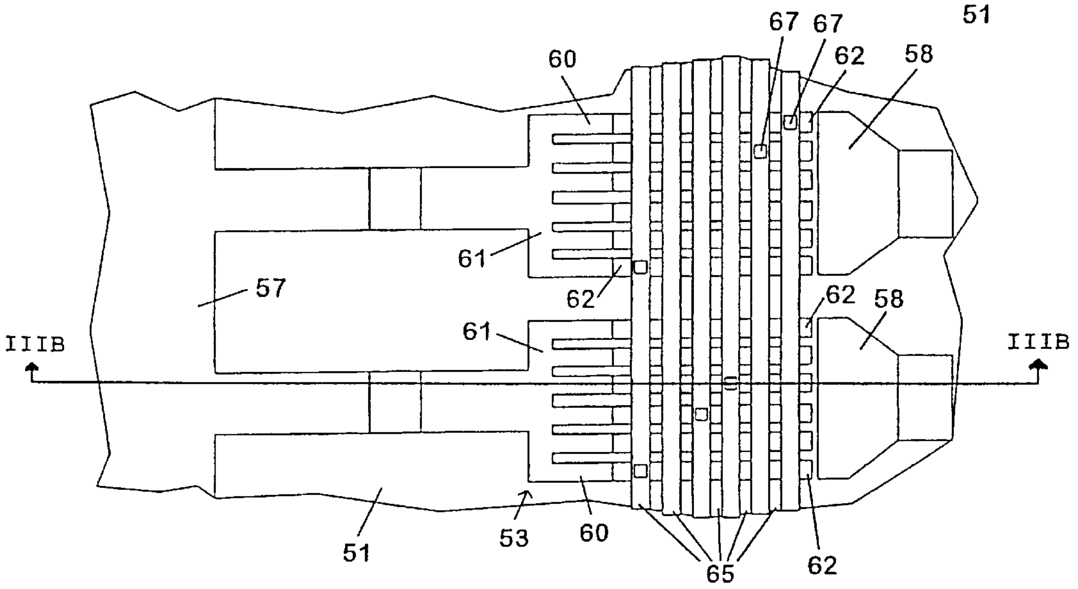
FIG. 3A is a plan view of a microelectric position sensor wherein each magnetic field sensitive element includes several subelements.

FIGS. 3A and 3B illustrate another embodiment of the invention on a larger scale. A static part 51 of silicon carries an assembly of micro reed contactors 53. In this embodiment each of the micro reed contactors 53 has a comb of tongues 60 which, at their roots 61, are connected to a common magnetic and electric conductor 57. When activated by a magnetic field, the tongues 60 will bend and touch respective ones of electrical and magnetic conductors 62 on the static part 51. An electric and magnetic terminal 58 is situated at the opposite ends of the electrical and magnetic conductors 62, with a small electrically insulating gap 63 between the conductors 62 and the terminal 58.

A movable part 52 is movably arranged above the micro reed contactors 53 on the static part 51. The movable part 52 carries a bar magnet 54 of permanent magnetic material. The opposed ends of the magnet 54 are connected to magnetic focusing tongues 55 and 56 of magnetically conductive material. The tongues 55 and 56 have the same function as the tongues 15 and 16, namely to focus the magnetic field from the magnet 54 on the common magnetic and electric conductor 57 and on an individual one of the electric and magnetic terminals 58, so that only one micro reed contactor 53 with its comb of tongues 60 will be activated.

The electrical and magnetic conductors 62 are covered by an insulating layer 64, and electrical conductors 65 are provided on top of the insulating layer 64. The illustrated embodiment includes six electrical conductors 65 and six tongues 60 in the comb of each of the micro reed contactors 53. The six conductors 65 are connected to (not shown) output terminals of the microelectric position sensor. At selected points 67 the electrical conductors 65 are connected to individual ones of the underlying electric and magnetic conductors 62. Electric contact is established at the contact points 67 through the insulating layer 64. Each micro reed contactor 53 has its individual combination of electrical conductors 65 connected to the electrical and magnetic conductors 62.

When the movable part 52 with the magnet 54 and focusing tongues 55 and 56 activate a particular micro reed contactor 53 with its comb of tongues 60, those of the electrical conductors 65, each connected to a potential representing logic '1' (one) through individual resistors, which are connected through the contact points 67 to the electrical and magnetic conductors 62, will be electrically connected through the micro reed contactor 53 with its comb of tongues 60 to the common electric conductor 57, which is in turn connected to an output terminal (not shown) of the microelectric position sensor. When used in an apparatus, the output terminal connected to the common electric conductor 57 will typically be connected to a reference potential such as ground potential representing logic "0" (zero), and the electrical conductors 65 will carry a binary code representing the position of the movable part 52. When the movable part is e.g. the rotary gain control of a digital hearing instrument, the output of the microelectric position sensor will be a digital code of the physical position of the gain control, which can be used by the digital circuits of the hearing instrument to set the gain correspondingly.

In the embodiment shown each of the micro reed contactors 53 have a six bit code corresponding to $2^6$=64 levels of the gain.

We claim:

1. A microelectric position sensor comprising an assembly including a plurality of magnetic field sensitive elements, each of said magnetic field sensitive elements assuming a first state when subjected to a magnetic field having an intensity below a first predetermined value, and assuming a second state different from said first state when subjected to a magnetic field having an intensity above a second predetermined value;

magnet means for producing a magnetic field, said magnet means being selectively movable relative to said assembly, thereby selectively subjecting said magnetic field sensitive elements to said magnetic field to selectively assume the first state or the second state;

said magnet means including focusing means focusing said magnetic field at a region including substantially only one of said magnetic field sensitive elements, said magnetic field within said region having an intensity above said second predetermined value, and said magnetic field outside said region having an intensity below said first predetermined value.

2. A position sensor according to claim 1 wherein said magnetic field sensitive elements include reed contacts.

3. A position sensor according to claim 1 wherein said magnetic field sensitive elements include Hall effect elements.

4. A position sensor according to claim 1 wherein said assembly is a circular assembly.

5. A position sensor according to claim 1 wherein said assembly is a linear assembly.

6. A position sensor according to claim 1 wherein said assembly is a two dimensional assembly.

7. A position sensor according to claim 1, wherein said magnet means includes a permanent magnet.

8. A position sensor according to claim 7 wherein said permanent magnet includes magnetic pole faces, and said focusing means are coupled to said pole faces.

9. A position sensor according to claim 8 wherein said focusing means include magnetically conductive tongues having end portions distant to said magnet for defining said region.

10. A position sensor according to claim 1, wherein at least some of said magnetic field sensitive elements include a subset of a plurality of subelements.

11. A position sensor according to claim 10 wherein, in each subset, a predetermined combination of said subelements is connectable to respective ones of a plurality of electrical conductors.

12. A position sensor according to claim 11 wherein said subelements are connectable to said electrical conductors in combinations individual to each subset.

* * * * *